(12) United States Patent
Stietzel

(10) Patent No.: US 6,467,431 B1
(45) Date of Patent: Oct. 22, 2002

(54) FISH FEEDING DEVICE

(76) Inventor: Andrew M Stietzel, 10 Olmstead Rd., West Redding, CT (US) 06896

( * ) Notice: Subject to any disclaimer, the term of this patent is extended or adjusted under 35 U.S.C. 154(b) by 30 days.

(21) Appl. No.: 09/612,108

(22) Filed: Jul. 7, 2000

(51) Int. Cl.[7] .............................................. A01K 61/00
(52) U.S. Cl. ..................................................... 119/215
(58) Field of Search ............................... 119/215, 56.1, 119/51.11, 51.13, 51.14

(56) References Cited

U.S. PATENT DOCUMENTS

| | | | | |
|---|---|---|---|---|
| 3,050,029 A | * | 8/1962 | Appleton | 119/51.14 |
| 4,044,722 A | * | 8/1977 | Bradshaw | 119/51.13 |
| 4,981,106 A | * | 1/1991 | Nagatomo | 119/51.11 |
| 5,078,097 A | * | 1/1992 | Chisholm | 119/51.13 |
| 5,113,796 A | * | 5/1992 | Matsuda | 119/51.11 |
| 5,133,292 A | * | 7/1992 | Kirk | 119/51.04 |

OTHER PUBLICATIONS

Catalog page from unknown catalog, unknown date, unknown page number showing "Rondomatic Feeder".
Catalog page from unknown catalog, unknown date, unknown page number showing "Feeders– Double A Brand Fish Sitter".
Catalog page from unknown catalog unknown date, unknown page number showing "Nutramatic".
Catalog page from unknown catalog, unknown date, unknown page number showing "14–day Fish Feeder".

* cited by examiner

Primary Examiner—Thomas Price

(57) ABSTRACT

A fish feeding device for automatically feeding fish at predetermined intervals. The fish feeding device includes a housing adapted for mounting to a side of a fish tank towards an upper rim thereof. A feeding wheel is rotatably mounted to the housing adapted for dispensing food into the fish tank. A timer is mounted to the housing and in communication with the motor. The motor rotates the feeding wheel at a predetermined time or interval indicated by the timer.

19 Claims, 3 Drawing Sheets

FISH FEEDING DEVICE

BACKGROUND OF THE INVENTION

1. Field of the Invention

The present invention relates to fish feeders and more particularly pertains to a new fish feeding device for automatically feeding fish at predetermined intervals.

2. Description of the Prior Art

The use of fish feeders is known in the prior art. More specifically, fish feeders heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,072,695; 5,037,018; 5,337,698; 4,296,710; 2,772,659; and 3,211,339.

While these devices fulfill their respective, particular objectives and requirements, the aforementioned patents do not disclose a new fish feeding device. The inventive device includes a housing adapted for mounting to a side of a fish tank towards an upper rim thereof. A feeding wheel is rotatably mounted to the housing adapted for dispensing food into the fish tank. A timer is mounted to the housing and in communication with the motor. The motor rotates the feeding wheel at a predetermined time or interval indicated by the timer.

In these respects, the fish feeding device according to the present invention substantially departs from the conventional concepts and designs of the prior art, and in so doing provides an apparatus primarily developed for the purpose of automatically feeding fish at predetermined intervals.

SUMMARY OF THE INVENTION

In view of the foregoing disadvantages inherent in the known types of fish feeders now present in the prior art, the present invention provides a new fish feeding device construction wherein the same can be utilized for automatically feeding fish at predetermined intervals.

The general purpose of the present invention, which will be described subsequently in greater detail, is to provide a new fish feeding device apparatus and method which has many of the advantages of the fish feeders mentioned heretofore and many novel features that result in a new fish feeding device which is not anticipated, rendered obvious, suggested, or even implied by any of the prior art fish feeders, either alone or in any combination thereof.

To attain this, the present invention generally comprises a housing adapted for mounting to a side of a fish tank towards an upper rim thereof. A feeding wheel is rotatably mounted to the housing adapted for dispensing food into the fish tank. A timer is mounted to the housing and in communication with the motor. The motor rotates the feeding wheel at a predetermined time or interval indicated by the timer.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new fish feeding device apparatus and method which has many of the advantages of the fish feeders mentioned heretofore and many novel features that result in a new fish feeding device which is not anticipated, rendered obvious, suggested, or even implied by any of the prior art fish feeders, either alone or in any combination thereof.

It is another object of the present invention to provide a new fish feeding device which may be easily and efficiently manufactured and marketed.

It is a further object of the present invention to provide a new fish feeding device which is of a durable and reliable construction.

An even further object of the present invention is to provide a new fish feeding device which is susceptible of a low cost of manufacture with regard to both materials and labor, and which accordingly is then susceptible of low prices of sale to the consuming public, thereby making such fish feeding device economically available to the buying public.

Still yet another object of the present invention is to provide a new fish feeding device which provides in the apparatuses and methods of the prior art some of the advantages thereof, while simultaneously overcoming some of the disadvantages normally associated therewith.

Still another object of the present invention is to provide a new fish feeding device for automatically feeding fish at predetermined intervals.

Yet another object of the present invention is to provide a new fish feeding device which includes a housing adapted for mounting to a side of a fish tank towards an upper rim thereof. A feeding wheel is rotatably mounted to the housing adapted for dispensing food into the fish tank. A timer is mounted to the housing and in communication with the motor. The motor rotates the feeding wheel at a predetermined time or interval indicated by the timer.

Still yet another object of the present invention is to provide a new fish feeding device that may be set to feed fish at the same time every day.

Even still another object of the present invention is to provide a new fish feeding device that both visually and audibly notifies a user when it is empty after the complete feeding cycle has run.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
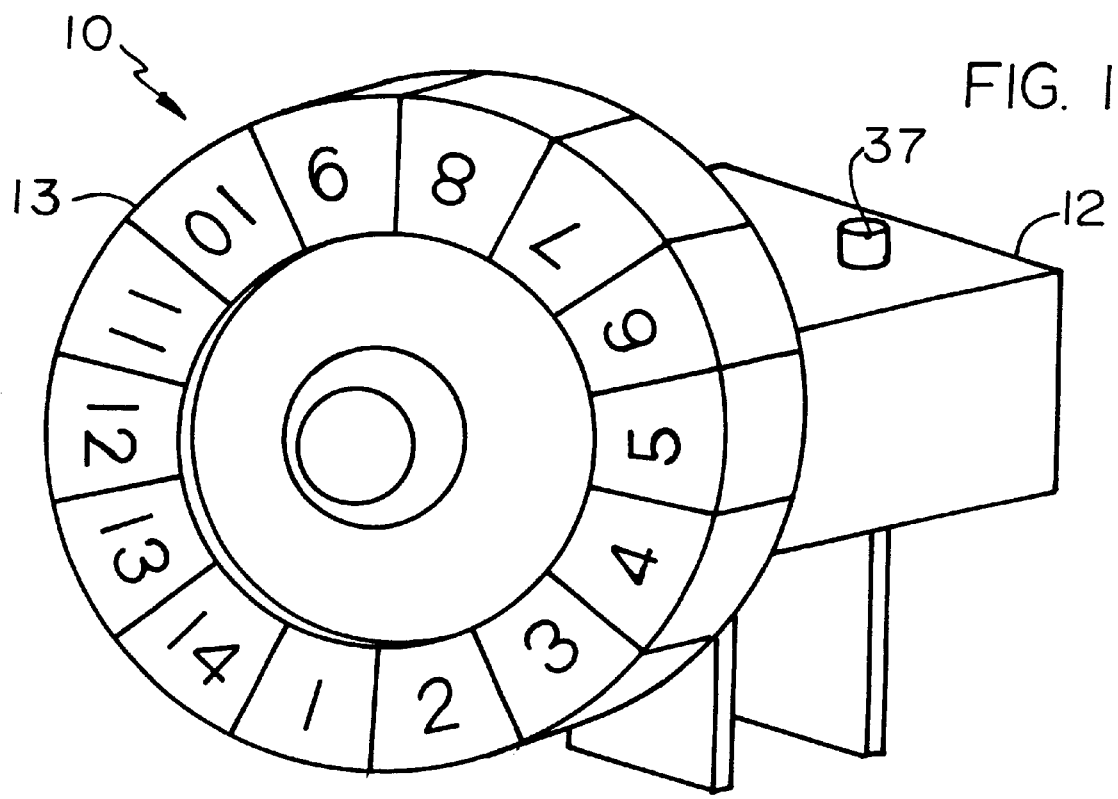
FIG. 1 is a schematic perspective view of a new fish feeding device according to the present invention.
Figure 3:
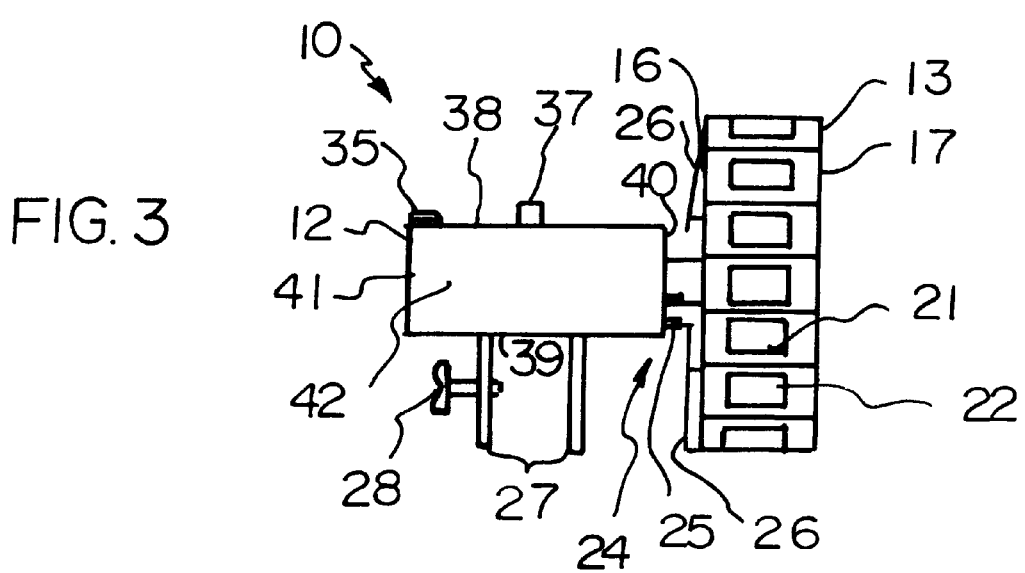
FIG. 3 is a schematic side view of the present invention.

With reference now to the drawings, and in particular to FIGS. 1 through 5 thereof, a new fish feeding device embodying the principles and concepts of the present invention and generally designated by the reference numeral 10 will be described.

As best illustrated in FIGS. 1 through 5, the fish feeding device 10 generally comprises a housing 12 adapted for mounting to a side of a fish tank towards an upper rim of the fish tank. A feeding wheel 13 is rotatably mounted to the housing and is adapted for dispensing food into the fish tank. A timer 14 is in communication with the motor. The motor rotates the feeding wheel at a predetermined time or interval indicated by the timer.

Preferably, the feeding wheel has an annular peripheral sidewall 15, a back panel 16 positioned towards the housing, a removable front panel 17 for loading the wheel, and a plurality of inner walls 18 extending from a center cylinder 19 of the feeding wheel to the outer sidewall such that a plurality of chambers 20 are formed between the inner walls and the peripheral sidewall. The chambers are adapted for receiving fish food therein. Preferably, there are at least fourteen chambers to permit unsupervised daily feeding of the fish for two complete weeks.

Figure 2:
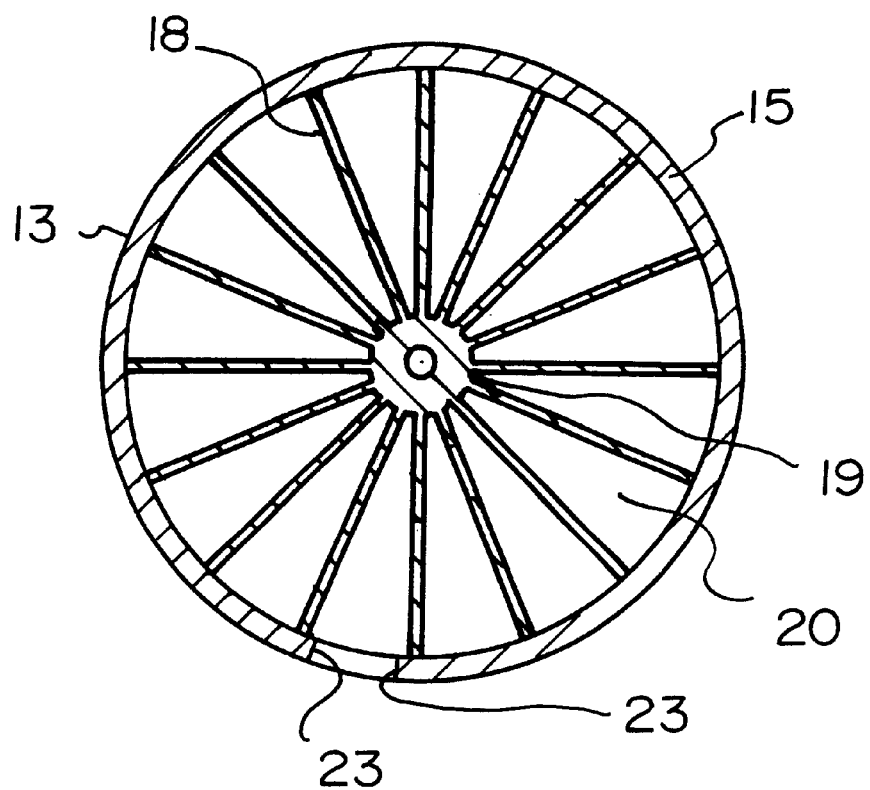
FIG. 2 is a schematic cross sectional view of the present invention.
Figure 4:
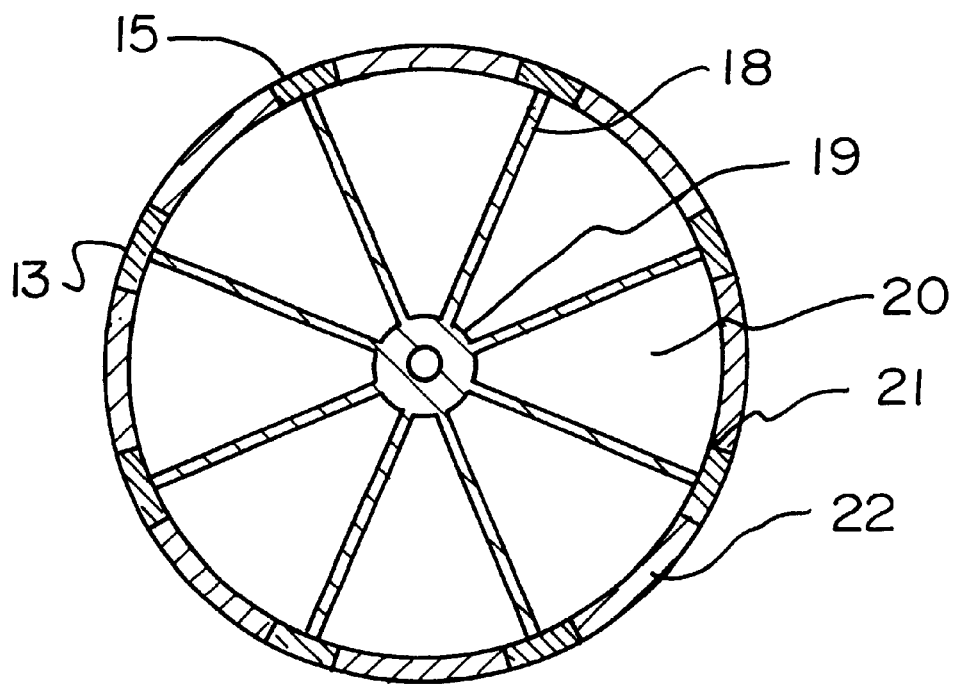
FIG. 4 is a schematic side view of the present invention.
Figure 5:
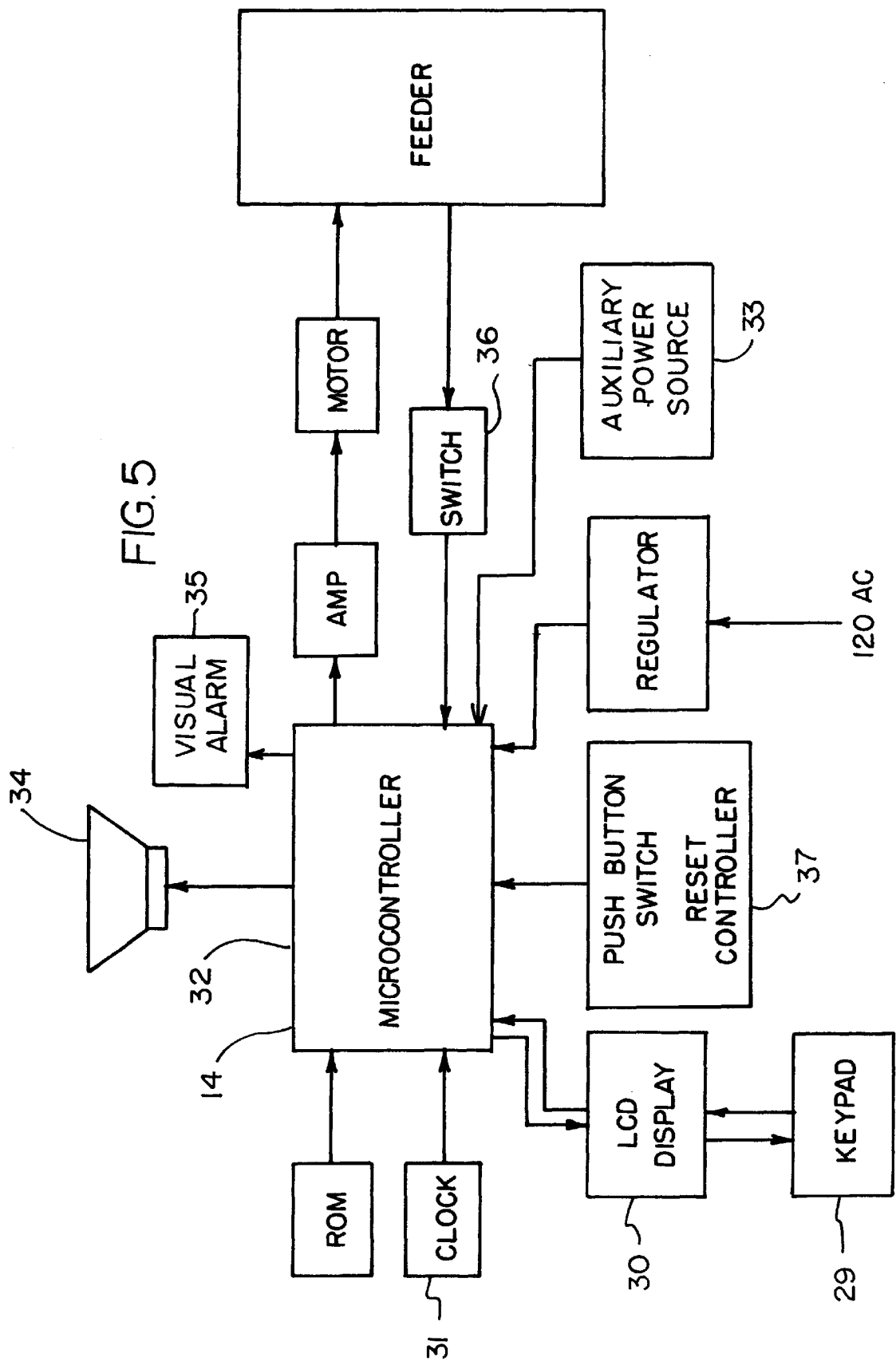
FIG. 5 is a schematic diagram of the electronic components present invention.

Ideally, as shown in FIG. 4, the peripheral sidewall has a plurality of openings 21 into the chambers and a plurality of doors 22 closing the openings into each of the chambers. Alternatively, as seen in FIG. 2, the peripheral sidewall has a lower hole 23 in it and the inner walls turn to dump the food through the lower hole.

An opening means 24 opens a lowermost of the doors at a predetermined time for releasing the fish food from the lowermost of the chambers. The lowermost of the doors is positioned towards water in the tank.

Ideally, the opening means comprises an opening pin 25 extending from the housing and a plurality of levers 26 coupled to the back panel of the feeding wheel, one lever for each door. The levers are in communication with the doors. The opening pin is alignable with a lever corresponding to the lowermost of the doors. The pin actuates the lever thereby opening the door. The pin selectively pushes the inner end of the lever towards the wheel and the outer end of the lever pulls the door open. For clarity, only two such levers are shown on FIG. 3. The levers should be biased towards a closed position by any suitable means so that the doors are closed when not actuated by the opening pin. Ideally, the pivot points of each lever is positioned towards the inner end of the lever so that a small push on the inner end causes a larger movement on the outer end of the lever.

Preferably, the housing has a pair of mounting brackets 27 downwardly extending from it and oriented on planes generally parallel the outer panel of the feeding wheel. The mounting brackets are adapted for receiving a wall of a fish tank therebetween for mounting the invention to the fish tank.

Ideally, one of the mounting brackets has an adjustment screw 28 extending through it for exerting pressure against the wall of the fish tank, pinching the wall between the screw and the other mounting bracket to hold the device on the wall.

The timer is mounted to the housing and in communication with the motor. The motor rotates the feeding wheel to place another chamber at the bottom when the timer tells it to, such as daily or every 12 hours.

Preferably, the housing has a keypad 29 for setting the timer and an LCD or LED display 30 for viewing timer settings set by the keypad. Also preferably, the housing has a clock 31 in communication with the timer so that the timer can be set to respond at predetermined times rather than intervals.

Ideally, the timer is in communication with the opening means and is programmable such that the opening means opens a lowermost of the doors of the feeding wheel at a predetermined time.

The housing has an alarm system 32 for indicating when the feeding wheel has completed a full revolution and all the chambers are empty, or when the device is finished with the feeding cycle, or when the device has stopped working. An optional auxiliary power source 33 such as a battery may be in electrical communication with the alarm system so that the alarm can go off to warn a user that the device has lost power.

Preferably, the alarm system includes an audible alarm 34 such as a speaker emitting beeps. Optionally, with or without the audible alarm, the alarm system may also include a visual alarm 35 such as a flashing light. This would warn deaf people that their fish are in peril.

One means for keeping track of the rotation of the feeding wheel is a switch 36 in communication with the alarm system and contacting the feeding wheel or an axle extending between the motor and the feeding wheel such that a signal is sent from the switch to the alarm system for each movement of the feeding wheel. This also permits the user to set the device for only a week, two weeks, or even longer periods, such as, for example, 3 to 4 weeks for larger commercial devices based on the invention.

Optionally, the wheel may be removable from its mounting to permit cleaning of the wheel and other components of the device.

Optionally, the housing has a reset button 37 protruding therefrom for resetting the alarm system.

The preferred dimensions of the housing are about 1 inch high between its upper and lower sides 38,39, about 1½ inches long between its front and back sides 40,41, and about 1½ inches wide between its lateral sides 42. The preferred outer diameter of the feeding wheel is about 3 inches.

In use, the front panel of the feeding wheel is removed and a desires amount of food is placed in the chambers of the feeding wheel. The front panel is replaced. The device is mounted to a fish tank with the feeding wheel over the water. The timer is set so that the device drops the food into the tank at the desired intervals or at the desired times and days.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A feeding device for feeding fish, comprising:
   a housing adapted for mounting to a side of a fish tank towards an upper rim thereof;
   a feeding wheel rotatably mounted to said housing adapted for dispensing food into said fish tank;
   said housing having a motor therein for selectively rotating said feeding wheel;
   a timer in communication with said motor, said motor rotating said feeding wheel at a predetermined time indicated by said timer; and
   a keypad for setting said timer and a display for viewing timer settings set by said keypad.

2. The feeding device of claim 1, wherein said feeding wheel has an annular peripheral sidewall, a back panel positioned towards said housing, a removable front panel, and a plurality of inner walls extending from a center cylinder of said feeding wheel to said peripheral sidewall such that a plurality of chambers are formed between said inner walls and said peripheral sidewall, said chambers being adapted for receiving fish food therein.

3. The feeding device of claim 2, wherein said peripheral sidewall of said feeding wheel has a plurality of openings into said chambers and a plurality of doors closing said openings into each of said chambers.

4. The feeding device of claim 3, further comprising an opening means for opening a lowermost of said doors at a predetermined time for releasing said fish food from said lowermost of said doors.

5. The feeding device of claim 4, wherein said opening means comprises an opening pin extending from said housing and a plurality of levers coupled to said back panel of said feeding wheel, said levers being in communication with said doors, said opening pin being alignable with a lever corresponding to said lowermost of said doors, wherein said pin actuates said lever thereby opening said door.

6. The feeding device of claim 1, wherein said housing has a pair of mounting brackets downwardly extending therefrom and oriented on planes generally parallel said outer panel of said feeding wheel, said mounting brackets being adapted for receiving a wall of a fish tank therebetween.

7. The feeding device of claim 1, wherein said housing has a clock in communication with said timer, wherein said timer is programmable to rotate said feeding wheel at predetermined times.

8. The feeding device of claim 1, wherein said housing has an alarm system for indicating when said feeding wheel has completed a full revolution.

9. The feeding device of claim 8, wherein said alarm system includes an audible alarm.

10. The feeding device of claim 8, wherein said alarm system includes a visual alarm.

11. The feeding device of claim 8, wherein said housing has a switch in communication with said alarm system and contacting said feeding wheel such that a signal is sent from said switch to said alarm system for each movement of said feeding wheel.

12. The feeding device of claim 8, wherein said housing has a reset button protruding therefrom for resetting said alarm system.

13. A feeding device for feeding fish, comprising:
   a housing adapted for mounting to a side of a fish tank towards an upper rim thereof;
   a feeding wheel rotatably mounted to said housing adapted for dispensing food into said fish tank, said feeding wheel having an annular peripheral sidewall with a plurality of opening formed therein that open into a plurality of chambers for receiving food therein, and a plurality of doors for selectively closing said openings into each of said chambers;
   a motor mounted on said housing for selectively rotating said feeding wheel;
   a timer in communication with said motor, said motor rotating said feeding wheel at a predetermined time indicated by said timer;
   an opening means for opening a lowermost of said doors at a predetermined time for releasing said fish food from said lowermost of said doors; and
   an alarm system for indicating when said feeding wheel has completed a full revolution and said opening means has opened each of said doors of said chambers to remove food from each of said chambers.

14. The feeding device of claim 13, wherein said alarm system includes an audible alarm.

15. The feeding device of claim 13, wherein said alarm system includes a visual alarm.

16. The feeding device of claim 13, wherein said housing has a switch in communication with said alarm system and contacting said feeding wheel such that a signal is sent from said switch to said alarm system for each movement of said feeding wheel.

17. The feeding device of claim 13, wherein said housing has a reset button protruding therefrom for resetting said alarm system.

18. The feeding device of claim 13, additionally comprising a keypad for setting said timer and a display for viewing timer settings set by said keypad.

19. The feeding device of claim 13, wherein said feeding wheel has a back panel positioned towards said housing, a removable front panel, and a plurality of inner walls extending from a center cylinder of said feeding wheel to said sidewall such that said plurality of chambers are formed between said inner walls and said peripheral sidewall;

wherein said opening means comprises an opening pin extending from said housing and a plurality of levers coupled to said back panel of said feeding wheel, said levers being in communication with said doors, said opening pin being alignable with a lever corresponding to said lowermost of said doors, wherein said pin actuates said lever thereby opening said door;

said housing having a pair of mounting brackets downwardly extending therefrom and oriented on planes generally parallel said outer panel of said feeding wheel, said mounting brackets being adapted for receiving a wall of a fish tank therebetween;

one of said mounting brackets having an adjustment screw extending therethrough for exerting pressure against said wall of said fish tank;

a keypad for setting said timer and a display for viewing timer settings set by said keypad;

said housing having a clock in communication with said timer;

wherein said timer is in communication with said opening means and is programmable such that said opening means opens a lowermost of said doors of said feeding wheel at a predetermined time;

said alarm system including an audible alarm;

said alarm system including a visual alarm;

wherein said housing has a switch in communication with said alarm system and contacting said feeding wheel such that a signal is sent from said switch to said alarm system for each movement of said feeding wheel; and said housing having a reset button protruding therefrom for resetting said alarm system.

\* \* \* \* \*